United States Patent
Gruenwald et al.

(10) Patent No.: US 9,941,558 B2
(45) Date of Patent: Apr. 10, 2018

(54) TEMPERATURE-CONTROL DEVICE, IN PARTICULAR FOR A BATTERY OF A MOTOR VEHICLE

(71) Applicant: Mahle International GmbH, Stuttgart (DE)

(72) Inventors: Juergen Gruenwald, Ludwigsburg (DE); Stefan Hirsch, Stuttgart (DE)

(73) Assignee: Mahle International GmbH (DE)

( * ) Notice: Subject to any disclaimer, the term of this patent is extended or adjusted under 35 U.S.C. 154(b) by 182 days.

(21) Appl. No.: 14/804,804

(22) Filed: Jul. 21, 2015

(65) Prior Publication Data

US 2016/0028132 A1      Jan. 28, 2016

(30) Foreign Application Priority Data

Jul. 22, 2014   (DE) .................. 10 2014 214 285

(51) Int. Cl.
   *H01M 10/6572*   (2014.01)
   *H01M 10/625*   (2014.01)
   *F25B 21/02*   (2006.01)

(52) U.S. Cl.
   CPC ..... *H01M 10/6572* (2015.04); *H01M 10/625* (2015.04); *H01M 2220/20* (2013.01)

(58) Field of Classification Search
   CPC .. H01M 10/6572; H01M 10/625; F25B 21/02
   See application file for complete search history.

(56) References Cited

U.S. PATENT DOCUMENTS 5,367,890 A    11/1994  Doke
6,274,803 B1 *  8/2001  Yoshioka ............... H01L 35/34
                                               136/201
2005/0172991 A1  8/2005  Arai et al.
2014/0013774 A1  1/2014  Grunwald et al.
2014/0038009 A1 * 2/2014  Okawa ................. H01M 10/486
                                               429/62
2015/0059820 A1  3/2015  Brueck et al.
2016/0329607 A1 * 11/2016  Miyao ................. H01M 2/1055

FOREIGN PATENT DOCUMENTS

DE    102012103968 A1    11/2013
DE    102012211259 A1    1/2014
WO    WO2015104770    *    7/2015

OTHER PUBLICATIONS

German Search Report for DE-102014214285.7, dated Mar. 12, 2015.

* cited by examiner

*Primary Examiner* — Stewart A Fraser
*Assistant Examiner* — Rachel L Zhang
(74) *Attorney, Agent, or Firm* — Fishman Stewart PLLC

(57) ABSTRACT

A temperature-control device for a battery of a motor vehicle may include a temperature-control plate including at least two rows of elements. Each of the at least two rows of elements may include at least two Peltier elements. Each Peltier element may include a first electric supply connection and a second electric supply connection for supplying each Peltier element with electrical energy. A first electric supply path may be disposed on the temperature-control plate and may define at least one of an open surround and a closed surround around the Peltier elements of the at least two rows of elements. At least one second electric supply path may be disposed on the temperature-control plate and may extend along a direction of extent with respect to an extent of the at least two rows of elements.

20 Claims, 2 Drawing Sheets

TEMPERATURE-CONTROL DEVICE, IN PARTICULAR FOR A BATTERY OF A MOTOR VEHICLE

CROSS-REFERENCE TO RELATED APPLICATIONS

This application claims priority to German Patent Application No. 10 2014 214 285.7, filed Jul. 22, 2014, the contents of which are hereby incorporated by reference in its entirety.

TECHNICAL FIELD

The invention relates to a temperature-control device, in particular for a battery of a motor vehicle. The invention also relates to a battery arrangement having such a temperature-control device and to a motor vehicle having at least one such battery arrangement.

BACKGROUND

In modern hybrid and electric motor vehicles, lithium-ion batteries are often used as rechargeable energy accumulators. A battery which is optimized in terms of service life and maximum energy storage quantity requires, for the individual battery cells, a correspondingly efficient temperature-control system which is capable of preventing, in particular, heating of the battery above a maximum operating temperature.

Against this background, active temperature-control systems which comprise a temperature-control structure through which a fluid can flow are known from the prior art. A temperature-control structure typically has two temperature-control plates which bound a fluid duct. Said temperature-control structure acts as a heat source or heat sink and permits the exchange of heat between the battery and the fluid. Said exchange of heat can be assisted by thermoelectric elements in the form of so-called Peltier elements which are mounted at different locations between the battery whose temperature is to be controlled and the temperature-control plates. From the prior art, for example DE 10 2012 211 259 A1 describes such a temperature-control system.

When using such Peltier elements, the electrical wiring proves problematic, in particular if said Peltier elements are to be used to control the temperature of battery cells in a motor vehicle, since there is typically only a little installation space available for wiring in a motor vehicle.

SUMMARY

The object of the present invention is therefore to provide an improved embodiment for a temperature-control device which is equipped with Peltier elements and which is distinguished, in particular by improved electrical wiring of simple design and, associated with this, by a small installation space requirement.

This object is achieved by the subject matter of the independent patent claims. Preferred embodiments are the subject matter of the dependent patent claims.

The basic idea of the invention is accordingly to arrange at least two rows of elements, each with at least two Peltier elements, on a battery temperature-control plate, referred to below as "temperature-control plate". In order to supply the Peltier elements with electrical energy, for which purpose each individual Peltier element has two electric supply connections, a first electric supply path is provided on the temperature-control plate, said supply path forming an open or closed surround around the Peltier elements when viewed in a plan view of the temperature-control plate. This ensures that a short electric line path for connecting the Peltier element to the first electric supply path is available for all Peltier elements which are present. In addition, a second electric supply path extends along a direction of extent which is defined by the rows of elements. The arrangement of the Peltier elements in rows of elements does not necessarily have to be effected in a linear fashion here, i.e. the direction of extent can also vary along the two rows of elements.

According to the invention, the first electric supply connection of each Peltier element is connected electrically to the first electric supply path, and the second electric supply connection of each Peltier element is connected electrically to the second electric supply path, or vice versa.

In order to be supplied with electrical energy, the first supply path can be connected electrically to a positive pole of an electrical energy source, and the second supply path to a negative pole of the energy source, or vice versa.

The arrangement of the two supply paths on the temperature-control plate, as presented here, permits the two supply connections of each Peltier element to be connected electrically to the first or second supply path without long electric line paths and/or a complicated line geometry, in particular with intersecting line paths, becoming necessary for such a connection. As a result, by means of the wiring configuration or connection configuration presented here, the fabrication expenditure for the wiring of the individual supply connections of the Peltier elements can be kept small even when there is a large number of Peltier elements. The same applies to the installation space which is necessary for the wiring on the temperature-control plate.

A particularly small wiring expenditure can be achieved in one preferred embodiment in which the first electric supply connection of each Peltier element is connected electrically to the first or second electric supply path via a respective electric connection path. As an alternative to this, the first electric supply connection is connected electrically to a further Peltier element via a respective electric connecting path. The same applies in this embodiment for the second electric supply connection of each Peltier element: said second electric supply connection is connected electrically to the first or second electric supply path via a respective electric connection path. As an alternative to this, the second electric supply connection can also be connected electrically to another Peltier element via a respective electric connecting path.

In one preferred embodiment, precisely two rows of elements can be provided. This permits a particularly advantageous arrangement of the two supply paths to be implemented in such a way that the first supply path which surrounds the Peltier elements runs as it were around the "outside" of the Peltier elements when viewed in a plan view of the temperature-control plate, and the second supply path extends between the two rows of elements, that is to say typically in a central region of the temperature-control plate. As a result, the first or second electric supply path is then present on two opposite sides of each Peltier element. This simplifies the wiring of the two connection elements of each Peltier element to the two electric supply paths.

The rows of elements can particularly expediently each be embodied as lines of elements which run linearly in a longitudinal direction on the temperature-control plate. Such a linear arrangement of the rows of elements can be implemented with particularly low fabrication expenditure. This results in cost advantages for the manufacture of the temperature-control device.

One preferred embodiment which is associated with a particularly low installation space requirement is obtained if the Peltier elements form at least two columns of elements. Said columns extend in a transverse direction transversely with respect to the lines of elements. In this way, a matrix of Peltier elements is formed, with the result that each Peltier element is assigned for the formation to precisely one line of elements and precisely one column of elements. A matrix-like arrangement of the Peltier elements additionally permits particularly uniform temperature-control of a battery which is thermally connected to the temperature-control plate.

If the temperature-control device according to the invention is to be supplied with electrical energy from the 48V on-board power system of a motor vehicle, a design is recommended in which at least one first Peltier element and one second Peltier element, adjacent thereto, form a Peltier element pair in such a way that the two Peltier elements are connected electrically in series. This results in an electric supply voltage of 24V dropping across each of the two Peltier elements; this value is the nominal operating voltage of the Peltier elements. For the purpose of electric connection in series, the two Peltier elements can be connected electrically to one another via a respective electric connecting path. Furthermore, one of the two Peltier elements is to be connected electrically to the first electric supply path via a respective electric connection path. Correspondingly, the other of the two Peltier elements must be connected electrically to the second electric supply path via a respective electric connection path.

In one advantageous development, at least two Peltier element pairs, preferably all the Peltier element pairs, of the temperature-control device can be connected electrically in parallel to one another with respect to the two electric supply paths. In this way, in principle any desired number of Peltier elements can be provided in the temperature-control device and supplied with electrical energy.

In another preferred embodiment, an element row spacing which is defined in the transverse direction, between two adjacent rows of elements, has a first value which is essentially twice as large as a second value of a spacing between a longitudinal side, extending in the longitudinal direction, of the temperature-control plate and the next row of elements. Such a geometry of the rows of elements gives rise to a particularly low installation space requirement.

Since the first electric supply path surrounds the two matrix lines with Peltier elements, and the second electric supply path runs between the two element rows, only approximately half of that electric current which is "distributed" to the Peltier elements via the first supply path flows through the second electric supply path. In order words, the first electric supply path has two essentially U-shaped path sections which lie opposite one another and which add together to form the first electric supply path and form the surround according to the invention. Each of the Peltier elements is therefore supplied with electrical energy or electric current from an energy source either via the first or second path section, i.e. the electric current supplied by the energy source is essentially distributed equally between the two path sections. On the other hand, electric current from all the electric Peltier elements flows through the second electric supply path which is arranged between the two rows of elements. If a first line cross section is therefore assigned to the first electric supply path and a second line cross section to the second electric supply path, it is appropriate to dimension the two line cross sections in such a way that the first line cross section has a value which is essentially half of a value of the second line cross section.

An embodiment in which the first line cross section is approximately 3 mm$^2$ proves particularly expedient. Consequently, the second line cross section is then approximately 6 mm$^2$.

In another preferred embodiment, the first electric supply path and the second electric supply path extend in a through-flow direction. The different embodiments explained above can then be implemented by varying a path width of the two supply paths. The first electric supply path accordingly has a first path width which extends transversely with respect to the direction of extent when viewed in a plan view of the temperature-control plate. The second electric supply path has a second path width which extends transversely with respect to the direction of extent when viewed in a plan view of the temperature-control plate. The ratio of the two path widths B1:B2 is preferably essentially 1:2. For example, the first path width B1 can be approximately 15 mm, and the second path width B2 can be approximately 30 mm.

The wiring expenditure for connecting electrical wires of the Peltier elements can be reduced further if the two supply connections are arranged laterally on the temperature-control plate when viewed in a plan view thereon. It is therefore considered to be particularly preferable to have an embodiment in which the Peltier elements are each equipped with an element housing with a side wall in which the two supply connections are arranged at a distance from one another. Instead of a closed housing, two cover plates, in particular ceramic plates, which bound the Peltier element in the manner of a sandwich can also be provided, with the result that the actual components of the Peltier element are exposed laterally between the two cover plates. In this case, said supply connections are also open. According to a further alternative, a lateral silicone surround, through which the two supply connections are routed, can be provided between the two cover plates. In this scenario, the side wall is formed by the silicone surround.

An arrangement of the two electric supply paths and all the electric connection paths as well as all electric connecting paths is also particularly preferably on the circuit board in such a way that they do not intersect when viewed in a plan view of the circuit board. This simplifies the expenditure during the electric wiring of the Peltier elements.

For the purpose of implementing the electric wiring of the individual Peltier elements as simply as possible in terms of fabrication technology, at least partial embodiment of the temperature-control plate in the form of a circuit board is recommended. In this case, the two first electric supply paths and all the electric connection paths and all the electric connecting paths are able to be respectively embodied as conductor tracks. The embodiment of the temperature-control plate as a circuit board entails considerable cost advantages during manufacture, in particular in the case of series fabrication.

An embodiment in which the conductor tracks which are embodied on the circuit board have a conductor track thickness of at least 0.2 mm proves particularly expedient.

In a further preferred embodiment, the temperature-control plate for each Peltier element comprises a through-opening into which a respective Peltier element is inserted, with the result that the through-opening is closed essentially by the respective Peltier element. This permits installation-space-optimised implementation of the temperature-control plate with a low overall height.

The invention also relates to a battery arrangement having a battery whose temperature is to be controlled, and having a temperature-control structure which forms a fluid duct. A fluid which acts as a temperature-control medium can flow through this duct. The battery arrangement also comprises a temperature-control device with one or more of the features mentioned above. According to the invention, the temperature-control device is arranged between the temperature-control structure and the battery whose temperature is to be controlled.

The invention finally relates to a motor vehicle having at least one such battery arrangement.

Further important features and advantages of the invention can be found in the dependent claims, the drawings and the associated description of the figures with reference to the drawings.

Of course, the features which are mentioned above and which are still to be explained below can be used not only in the respectively specified combination but also in other combinations or alone without departing from the scope of the present invention.

Preferred exemplary embodiments of the invention are illustrated in the drawings and explained in more detail in the following description, wherein identical reference symbols relate to identical or similar or functionally identical components.

BRIEF DESCRIPTION OF THE DRAWINGS

In the drawings, in each case in a schematic form.

DETAILED DESCRIPTION

Figure 1:
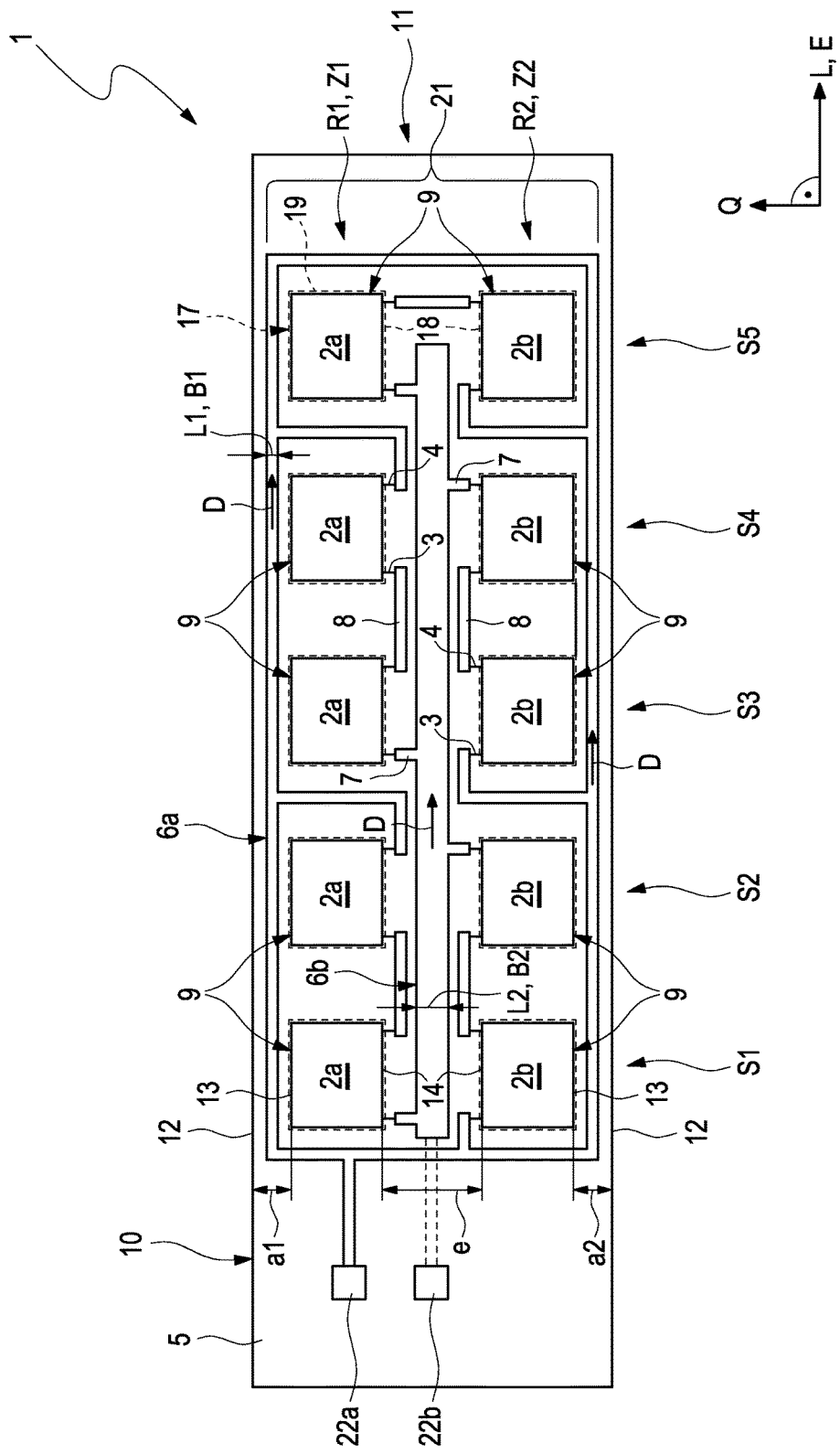
FIG. 1 shows a first example of a temperature-control device according to the invention when viewed in a plan view of a temperature-control plate of the temperature-control device.

FIG. 1 illustrates, in a schematic view, a plan view of a temperature-control device 1 according to the invention for controlling the temperature of the battery of a motor vehicle. The temperature-control device 1 has a temperature-control plate 10 on which two rows of elements R1, R2, each with at least two Peltier elements 2a, 2b, are provided. The two rows of elements R1, R2 extend in a direction of extent E, which runs linearly in the example and is therefore identical to a longitudinal direction L which is defined by a longitudinal side of the temperature-control plate 10. However, in variants a non-linear arrangement of the row of elements R1, R2 is also conceivable. In this case, the direction of extent E varies along the row of elements R1, R2 (not shown). Each of the Peltier elements 2a, 2b has a first and a second electric supply connection 3, 4 for supplying the respective Peltier element 2a, 2b with electrical energy. For this purpose, the first electric supply connection 3 is to be connected to the positive electrical potential of an energy source, and the second electric supply connection 4 to a negative electrical potential of the energy source, or vice versa.

In the example, each of the two rows of elements R1, R2 has five Peltier elements 2a, 2b. In variants of the example, this number can, of course, vary. It is also possible to provide further additional rows of elements (not shown in the example). The Peltier elements 2a, 2b each have a sufficiently dimensioned element housing 17, indicated only schematically in the illustration in FIG. 1, with a side wall 18. The two supply connections 3, 4 can, as shown in FIG. 1, be provided in a side wall 18 of a respective element housing 17 at a distance from one another. Instead of a closed housing 17 it is also possible to provide two cover plates, in particular ceramic plates, which bound the Peltier element in the manner of a sandwich, with the result that the actual components of the Peltier element 2a, 2b are exposed laterally between the two cover plates. In this case, said supply connections 3, 4 are also exposed. In a further variant, a lateral silicone surround, through which the two supply connections 3, 4 are routed, can be provided between the two cover plates. In this scenario, the side wall 18 is formed by the silicone surround.

Figure 2:
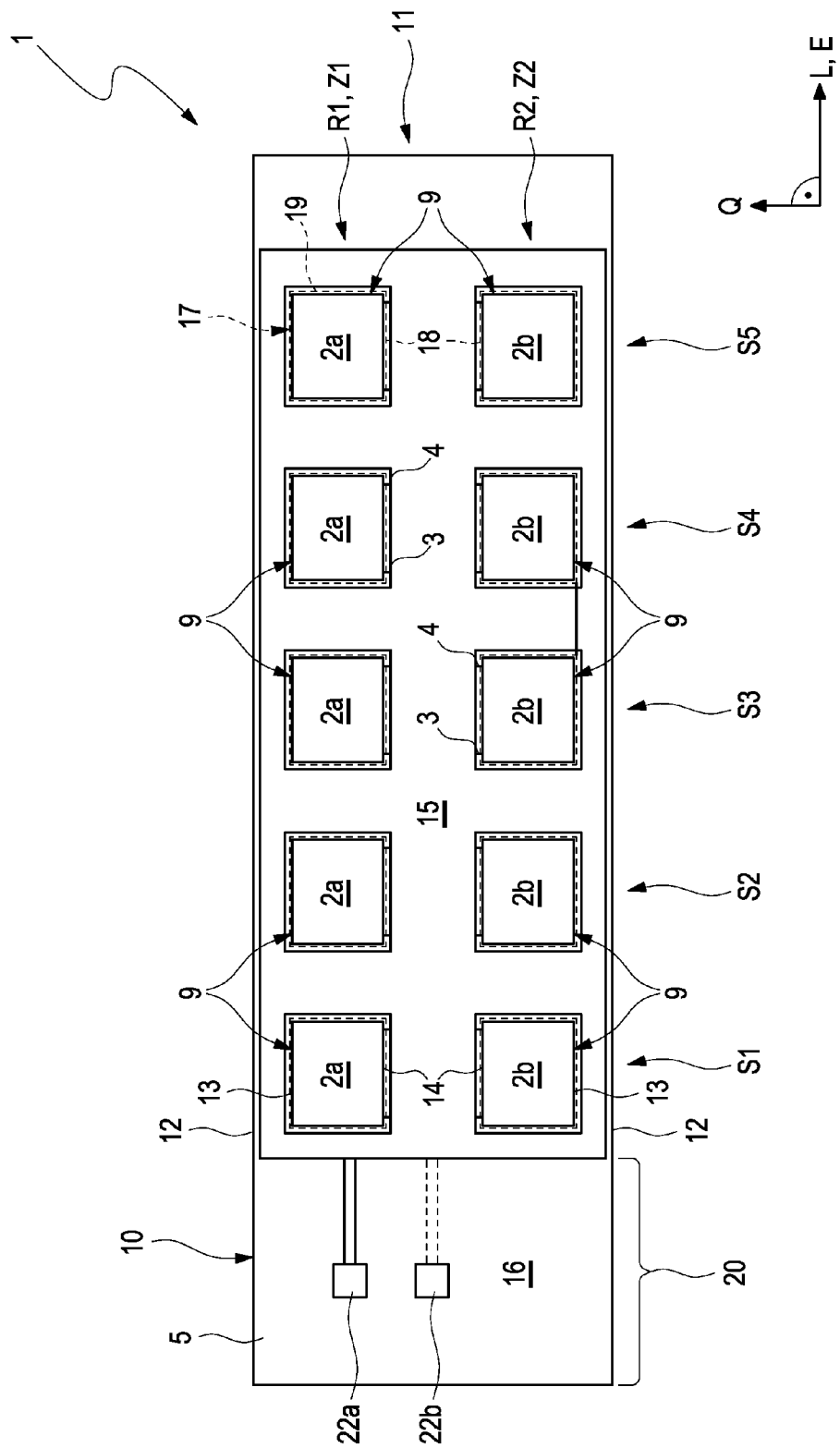
FIG. 2 shows an alternative illustration of FIG. 1.

The illustration in FIG. 2 shows a possible embodiment of the temperature-control plate 10. In FIG. 2, the arrangement of the electric paths 6a, 6b, 7, 8 to be explained below with reference to FIG. 1, is not shown for reasons of clarity; it corresponds to the arrangement in FIG. 1. In order to accommodate the Peltier elements 2a, 2b, a through-opening 19, into which in each case a Peltier element 2a, 2b is inserted in the course of the assembly of the temperature-control device 1, can in each case be provided in the temperature-control plate 10 at those positions at which the Peltier elements 2a, 2b are to be positioned. In such a mounted state of the temperature-control plate 10, the through-openings 10 are closed essentially by the respective Peltier element 2a, 2b. The Peltier elements 2a, 2b can be attached, for example by means of bonding, to the temperature-control plate 10.

The electric wiring of the Peltier elements 2a, 2b in order to supply them with electrical energy from an external energy source is explained below again with reference to FIG. 1. On a first side 5 of the temperature-control plate 10, a first electric supply path 6 is provided, which supply path 6 forms a closed surround around the Peltier elements 2a, 2b. In a variant which is not shown, the surround can also be embodied in an open way. In this case, the surround has an interruption. It would be possible, for example, to dispense with the section of the first supply path 6a which is denoted by 21. To a relevant person skilled in the art it is clear that such an interruption in the surround can also be provided at another place on the closed profile (shown in FIG. 1) of the first electric supply path 6a.

In addition to the first supply path 6a, a second electric supply path 6b is also provided on the temperature-control plate 10. Said supply path 6b extends in the direction of extent E defined by the extent of the two rows of elements R1, R2, and therefore also in the longitudinal direction L in the example in FIG. 1. In the example in FIG. 1, the two rows of elements R1, R2 are embodied as lines of elements Z1, Z2 which each extend linearly in the longitudinal direction L on the temperature-control plate 10, said lines of elements Z1, Z2 being arranged at a distance from one another in a transverse direction R transversely with respect to the longitudinal direction L. In variants the rows of elements R1, R2 can, however, also be arranged in a non-linear fashion (not shown). In this context, for example a curved or curve-like arrangement geometry is conceivable. Different arrangement geometries can also vary in certain sections here. It is conceivable also that different rows of elements are provided with an individual arrangement geometry.

Of course, in variants it is also possible to provide further second electric supply paths 6b, which is recommended, in particular, if more than two rows of elements R1, R2 of Peltier elements 2a, 2b are to be formed on the temperature-control plate 10. It then proves advantageous to provide an individual, second electric line path (not shown) between every two adjacent rows of elements.

In addition, FIG. 1 shows figuratively that the first electric supply connection 4 of each Peltier element 2a, 2b is connected electrically to the first electric supply path 6a, and the second electric supply connection 4 of each Peltier element 2a, 2b is connected electrically to the second electric supply path 6b, or vice versa.

It is also apparent that the first electric supply connection 3 of each Peltier element 2a, 2b is electrically connected to the first or second electric supply path 6a, 6b via a respective electric connection path 7. As an alternative to this, the first electric supply connection 3 can, however, also be connected electrically to another Peltier element 2a, 2b via an electric connecting path 8, specifically to the first or second supply connection 3, 4 thereof. The same applies to the second electric supply connection 4 of each Peltier element 2a, 2b. Said supply connection 4 is connected electrically to the first or second electric supply path 6a, 6b via a respective electric connection path 7, or as an alternative to this connected electrically to the first or second electric supply connection 3, 4 of another Peltier element 2, 2b via a respective electric connecting path 8.

In the scenario in the examples in FIGS. 1 and 2, the Peltier elements 2a, 2b are arranged not only in such a way that they form two lines of elements Z1, Z2, but instead they also form a matrix 11 when viewed in the plan view of the first side 5 of the temperature-control plate 10 which is shown in FIG. 1. In this respect, the Peltier elements 2a, 2b form five columns of elements S1 to S5. Each of the columns of elements S1-S5 is formed here by a Peltier element 2a, which is associated with the first line of elements Z1, and a Peltier element 2b, which is associated with the second line of elements Z2. The columns of elements S1 to S5 extend transversely with respect to the lines of elements Z1, Z2 in a transverse direction Q which runs orthogonally with respect to the longitudinal direction L. Each Peltier element is therefore assigned to precisely one line of elements Z1, Z2 and one column of elements S1-S5. The wiring configuration, explained above, of the Peltier elements 2a, 2b permits advantageous arrangement of the two electric supply paths 6a, 6b of all the electric connection paths 8 and of all the electric connecting paths 7 on the temperature-control plate 10 in such a way that they do not intersect when viewed in a plan view of the temperature-control plate 10.

If the electric wiring of the individual Peltier elements 2a, 2b is considered in FIG. 1, it is also apparent that in each case two Peltier elements 2a, 2b form a Peltier element pair 9 whose Peltier elements 2a, 2b are connected electrically in series. For this purpose, the two Peltier elements 2a, 2b are electrically connected to one another via the electric connecting path 8. The first Peltier element 2a, 2b of each Peltier element pair 9 is connected electrically to the first electric supply path 6a via a respective electric connection path 7, and the second Peltier element 2a, 2b of each Peltier element pair 9 is also connected electrically to the second electric supply path 6b via a respective electric connection path 7, or vice versa. On the basis of the example explained above, a wide range of variation possibilities emerge for a person skilled in the art. It is conceivable, for example, for just some of the Peltier elements 2a, 2b to form a Peltier element pair 9 with an electric series connection. It is also conceivable that not only two Peltier elements 2a, 2b but rather three or more Peltier elements 2a, 2b are connected electrically in series.

As is also apparent from FIG. 1, an element row spacing e can be defined between the two rows of elements R1, R2. Said spacing e relates to two longitudinal sides 14, facing one another, of two Peltier elements 2a, 2b which are adjacent in the transverse direction Q. The element row spacing e has, in the example, a value which is essentially twice as large as the value of a spacing a1 or a2 between the longitudinal side 12, extending in the longitudinal direction L of the temperature-control plate 10 and a corresponding longitudinal side 13, facing the longitudinal side 12 of the temperature-control plate 10, of a Peltier element 2a, 2b, which is assigned to the respective next row of elements R1 or R2.

The two electric supply paths 6a, 6b have a first or second line cross section L1, L2, orthogonally with respect to an electric throughflow direction D of the two supply paths 6a, 6b. If the two electric supply paths 6a, 6b are considered in the plan view of the first side 5 of the temperature-control plate 10 which is shown in FIG. 1, it is apparent that the first line cross section L1 has a value which is essentially half the value of the second line cross section L2. In variants of the example, other values of the ratio between the two line cross sections L1/L2 with respect to one another are also possible. The first line cross section can be, for example, 3 mm$^2$. However, in variants other values from which the person skilled in the art can select according to application-specific criteria are also possible here.

The first electric supply path 6a can have a first path width B1 which extends transversely with respect to the throughflow direction D when viewed in a plan view of the first side 5 of the temperature-control plate 10, said first path width B1 being essentially 15 mm in the example. The second electric supply path can have a second path width B2, extending transversely with respect to the throughflow direction D when viewed in a plan view of the temperature-control plate 10, said second path width B2 being essentially 30 mm. In variants, other values are also conceivable for the path widths B1, B2. Values at which the ratio of the two path widths B1:B2 assumes a value of 1:2, that is to say 0.5, are preferred.

Finally, if the illustration in FIG. 2 is considered again, it is apparent that the temperature-control plate 10 can comprise a circuit board 15 for the sake of easy implementation, in terms of fabrication technology, of the electric wiring of the Peltier elements 2a, 2b which is described above. Said circuit board 15 can, for example, be present in an end section 20, defined in the longitudinal direction L, of the temperature-control plate 10, which end section 20 forms a connection zone 16. In the connection zone 16, a first electric connection element 22a can be arranged which is connected electrically directly to the first supply path 6a. A second electric connection element 22b can be provided, for instance, by means of a solder connection and/or cable connection on a second side 23 lying opposite the first side 5 of the temperature-control plate (not illustrated in the plan views of the first side 5 in FIGS. 1 and 2) and connected to the second electric supply path 6b. Of course, other, varied options for implementing the connection zone 16 are also apparent to a person skilled in the art.

The two electric supply paths 6a, 6b, the electric connection paths 7 and the electric connecting paths 8 can be configured as conventional conductor tracks which can be formed in the circuit board 15 in a manner known to the relevant person skilled in the art in the course of the fabrication of said circuit board 15. The conductor tracks are preferably provided here with a conductor track thickness of at least 0.2 mm. In application-specific variants, other suitable values are also conceivable.

In another variant of the example in FIG. 2, the temperature-control plate 10 can also be embodied completely as a circuit board 15.

The invention claimed is:

1. A temperature-control device for a battery of a motor vehicle, comprising:
a temperature-control plate including at least two rows of elements, each of the at least two rows of elements including at least two Peltier elements, wherein each Peltier element has a first electric supply connection and a second electric supply connection for supplying each Peltier element with electrical energy,
a first electric supply path disposed on the temperature-control plate and defining at least one of an open surround and a closed surround around the Peltier elements of the at least two rows of elements,
at least one second electric supply path disposed on the temperature-control plate and extending between the at least two rows of elements along a direction of extent with respect to an extent of the at least two rows of elements,
wherein the first electric supply connection of each Peltier element is connected electrically to one of the first electric supply path and the second electric supply path, and the second electric supply connection of each Peltier element is connected electrically to the other of the first electric supply path and the second electric supply path.

2. The temperature-control device according to claim 1, wherein:
the first electric supply connection of each Peltier element is connected electrically to one of the first electric supply path and the second electric supply path via a respective first electric connection path or is connected electrically to another Peltier element via a second electric connection path, and
the second electric supply connection of each Peltier element is connected electrically to the other of the first electric supply path and the second electric supply path via a respective first electric connection path or is connected electrically to another Peltier element via a respective second electric connection path.

3. The temperature-control device according to claim 1, wherein the temperature-control plate has precisely two rows of elements.

4. The temperature-control device according to claim 1, wherein the at least two rows of elements each define a line of elements extending linearly on the temperature-control plate along a longitudinal direction.

5. The temperature-control device according to claim 4, wherein the at least two Peltier elements of each row of elements correspond to define at least two columns of elements, the at least two columns of elements extending in a transverse direction transversely with respect to each line of elements, and wherein each Peltier element is disposed in one line of elements and one column of elements to define a matrix of Peltier elements.

6. The temperature-control device according to claim 1, wherein the at least two Peltier elements of at least one row of elements includes at least one first Peltier element disposed adjacent to at least one second Peltier element;
the at least one first Peltier element and the at least one second Peltier element form a Peltier element pair, and the at least one first Peltier element and the at least one second Peltier element of the Peltier element pair are connected electrically in series to one another,
the at least one first Peltier element and the at least one second Peltier element are connected electrically to one another via a second electric connection path, and
the at least one first Peltier element is connected electrically to one of the first electric supply path and the second electrical supply path via a first electric connection path, and the at least one second Peltier element is connected electrically to the other of the first electric supply path and the second electric supply path via a first electric connection path.

7. The temperature-control device according to claim 6, wherein at least two Peltier element pairs are disposed on the temperature-control plate, the at least two Peltier element pairs being connected electrically in parallel to one another.

8. The temperature-control device according to claim 6, wherein an element row spacing is defined in a transverse direction between the at least two rows of elements, the element row spacing having an extent at least twice as large as an extent of a spacing between a longitudinal side, extending in a longitudinal direction transverse to the transverse direction, of the temperature-control plate and at least one row of elements.

9. The temperature-control device according to claim 1, wherein:
the first electric supply path has a first line cross section, and the second electric supply path has a second line cross section,
and wherein the first line cross section has an extent approximately half of an extent of the second line cross section.

10. The temperature-control device according to claim 9, wherein the first electric line cross section defines an area of approximately 3 mm$^2$.

11. The temperature-control device according to claim 1, wherein:
the first electric supply path and the second electric supply path extend along a throughflow direction,
the first electric supply path has a first path width which extends transversely to the throughflow direction with respect to a plan view of the temperature-control plate,
the second electric supply path has a second path width which extends transversely to the throughflow direction with respect to the plan view of the temperature-control plate, and
the first path width and the second path width define a ratio of 1:2 with respect to each other.

12. The temperature-control device according to claim 1, wherein the first electric supply path and the second electric supply path are arranged on the temperature-control plate to extend separately such that the first electric supply path and the second electric supply path do not intersect with respect to a plan view of the temperature-control plate.

13. The temperature-control device according to claim 1, wherein:
the temperature-control plate is a circuit board, and
the first electric supply path and the second electric supply path are each configured as a conductor track disposed on the circuit board.

14. The temperature-control device according to claim 13, wherein each of the conductor tracks have a conductor track thickness of at least 0.2 mm.

15. The temperature-control device according to claim 1, wherein each of the Peltier elements include an element housing, and each element housing has a side wall respectively including the first electric supply connection and the second electric supply connection arranged at a distance from one another.

16. The temperature-control device according to claim 1, wherein the temperature-control plate for each Peltier element has a through-opening into which the respective Peltier element is arranged.

17. The temperature-control device according to claim 16, wherein each through-opening is closed by the respective Peltier element.

18. A battery arrangement for a motor vehicle, comprising:
- a battery,
- a temperature-control structure defining a fluid duct, and
- a temperature-control device, the temperature-control device including:
- a temperature-control plate including at least two rows of elements, each of the at least two rows of elements including at least two Peltier elements, wherein each Peltier element has a first electric supply connection and a second electric supply connection for supplying the Peltier element with electrical energy;
- a first electric supply path disposed on the temperature-control plate and defining at least one of an open surround and closed surround around the Peltier elements of the at least two rows of elements; and
- at least one second electric supply path disposed on the temperature-control plate and extending between the at least two rows of elements along a direction of extent with respect to an extent of the at least two rows of elements;
- wherein the first electric supply connection of each Peltier element is connected electrically to one of the first electric supply path and the second electric supply path, and the second electric supply connection of each Peltier element is connected electrically to the other of the first electric supply path and the second electric supply path; and
- wherein the temperature-control device is arranged in a sandwich-like relationship between the temperature-control structure and the battery for controlling the temperature of the battery.

19. The battery arrangement according to claim 18, wherein at least one of:
- the first electric supply connection of each Peltier element is connected electrically to one of the first electric supply path and the second electric supply path via a respective first electric connection path or is connected electrically to another Peltier element via a respective second electric connection path; and
- the second electric supply connection of each Peltier element is connected electrically to the other of the first electric supply path and the second electric supply path via a respective first electric connection path or is connected electrically to another Peltier element via a respective second electric connection path.

20. A motor vehicle, comprising: at least one battery arrangement, the at least one batter arrangement including:
- a battery;
- a temperature-control structure defining a fluid duct; and
- a temperature-control device, the temperature-control device including:
- a temperature-control plate including at least two rows of elements, each of the at least two rows of elements including at least two Peltier elements, wherein each Peltier element has a first electric supply connection and a second electric supply connection for supplying the Peltier element with electrical energy;
- a first electric supply path disposed on the temperature-control plate and defining at least one of an open surround and closed surround around the Peltier elements of the at least two rows of elements; and
- at least one second electric supply path disposed on the temperature-control plate and extending between the at least two rows of elements along a direction of extent with respect to an extent of the at least two rows of elements;
- wherein the first electric supply connection of each Peltier element is connected electrically to one of the first electric supply path and the second electric supply path, and the second electric supply connection of each Peltier element is connected electrically to the other of the first electric supply path and the second electric supply path; and
- wherein the temperature-control device is arranged in a sandwich-like relationship between the temperature-control structure and the battery for controlling the temperature of the battery.

* * * * *